US008890054B2

(12) United States Patent
Ogaki et al.

(10) Patent No.: US 8,890,054 B2
(45) Date of Patent: Nov. 18, 2014

(54) PHOTOELECTRIC SENSOR USED FOR DETECTION OF THIN OBJECTS

(75) Inventors: Shinji Ogaki, Ayabe (JP); Tetsuyuki Katayama, Ayabe (JP); Kiyohiko Gondo, Kameoka (JP); Katsuhiko Kato, Kawasaki (JP)

(73) Assignee: Omron Corporation, Kyoto (JP)

( * ) Notice: Subject to any disclaimer, the term of this patent is extended or adjusted under 35 U.S.C. 154(b) by 320 days.

(21) Appl. No.: 12/941,594

(22) Filed: Nov. 8, 2010

(65) Prior Publication Data

US 2011/0272563 A1    Nov. 10, 2011

(30) Foreign Application Priority Data

Nov. 10, 2009   (JP) ................. P2009-256903

(51) Int. Cl.
| G06M 7/00 | (2006.01) |
| G01N 21/86 | (2006.01) |
| G01B 11/00 | (2006.01) |
| G01B 11/02 | (2006.01) |
| G01V 8/12 | (2006.01) |

(52) U.S. Cl.
CPC ............... *G01B 11/00* (2013.01); *G01B 11/02* (2013.01); *G01V 8/12* (2013.01)
USPC ..................... 250/221; 250/559.09

(58) Field of Classification Search
CPC ................................................ G08B 13/183
USPC ............. 250/221, 559.09, 559.11, 559.12; 340/555, 556
See application file for complete search history.

(56) References Cited

U.S. PATENT DOCUMENTS

| 734,575 A | 7/1903 | Krubetke |
| 847,488 A | 3/1907 | Metterhausen |

(Continued)

FOREIGN PATENT DOCUMENTS

| EP | 2 042 854 A2 | 4/2009 |
| JP | U51-159695 | 12/1951 |

(Continued)

OTHER PUBLICATIONS

European Patent Office extended search report on application No. 10189644.7 dated Feb. 25, 2011; 6 pages.

(Continued)

*Primary Examiner* — Thanh Luu
(74) *Attorney, Agent, or Firm* — Foley & Lardner LLP

(57) ABSTRACT

A photoelectric sensor includes a phototransmitter that outputs light toward a detection target region of an object; an optical receiver that receives the light outputted from the phototransmitter; a signal processing unit that outputs a signal indicating that the object is detected in response to a decrease of an amount of light received by the optical receiver; and two optical filters that are provided between the phototransmitter and the optical receiver to transmit only pieces of light having specific characteristics. In the phototransmitter, two kinds of light having different characteristics and that do not interfere with each other are outputted from output regions in the light transmitting surface; one of the two optical filters has a characteristic of transmitting only one of the two kinds of light and the other of the optical filters has a characteristic of transmitting only the other of the two kinds of light; the optical filters are disposed opposite to output regions of the pieces of light different from the pieces of light of a selecting target while located across a detection target region; and output directions of the two kinds of light are fixed such that whole surfaces of the optical filters corresponding to the characteristics are irradiated with the two kinds of light from the phototransmitter when the optical filters are disposed in a light transmitting surface while located away from each other by a predetermined distance or more.

7 Claims, 10 Drawing Sheets

(56) References Cited

U.S. PATENT DOCUMENTS

| | | | |
|---|---|---|---|
| 4,734,575 A * | 3/1988 | Wagli et al. | 250/221 |
| 4,847,488 A * | 7/1989 | Muller et al. | 250/225 |
| 5,266,812 A | 11/1993 | Mokuo | |
| 5,319,216 A | 6/1994 | Mokuo et al. | |
| 7,417,716 B2 * | 8/2008 | Nagasaka et al. | 356/4.01 |
| 2008/0273758 A1 | 11/2008 | Fuchs et al. | |

FOREIGN PATENT DOCUMENTS

| JP | U58-021295 | 2/1983 |
|---|---|---|
| JP | U62-123188 | 8/1987 |
| JP | 6-069323 | 3/1994 |
| JP | 2003-281982 | 10/2003 |
| JP | 2005-227121 | 8/2005 |
| JP | 2007-258386 | 10/2007 |
| JP | 2009-216489 | 9/2009 |
| JP | 2009-216849 | 9/2009 |

OTHER PUBLICATIONS

Office Action dated Mar. 19, 2013 issued in connection with Japanese Application No. JP2009-256903, with English translation.
European Patent Office Communication pursuant to Article 94(3) EPC on application 10 189 644.7 mailed May 15, 2013; 5 pages.

* cited by examiner

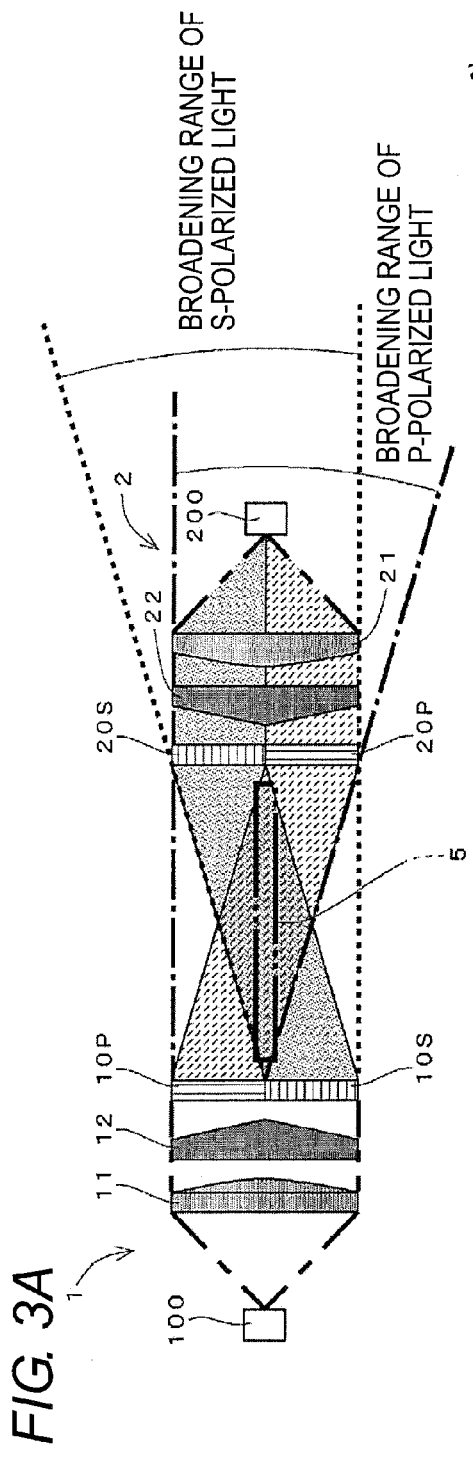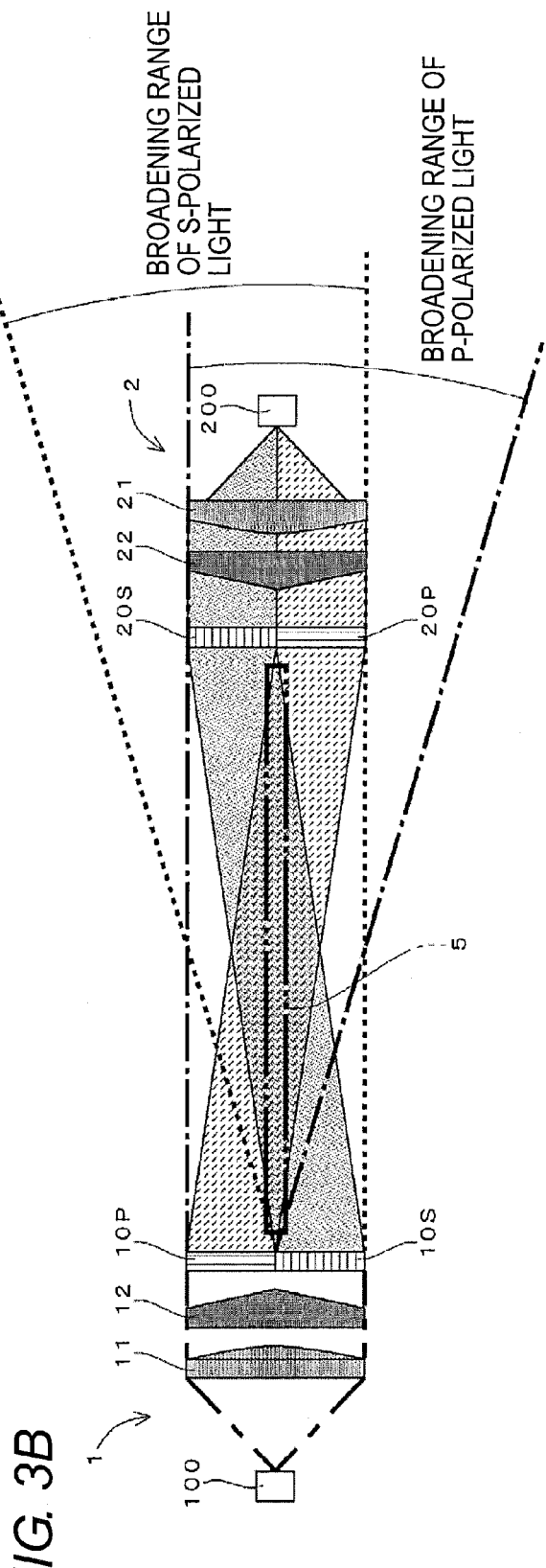

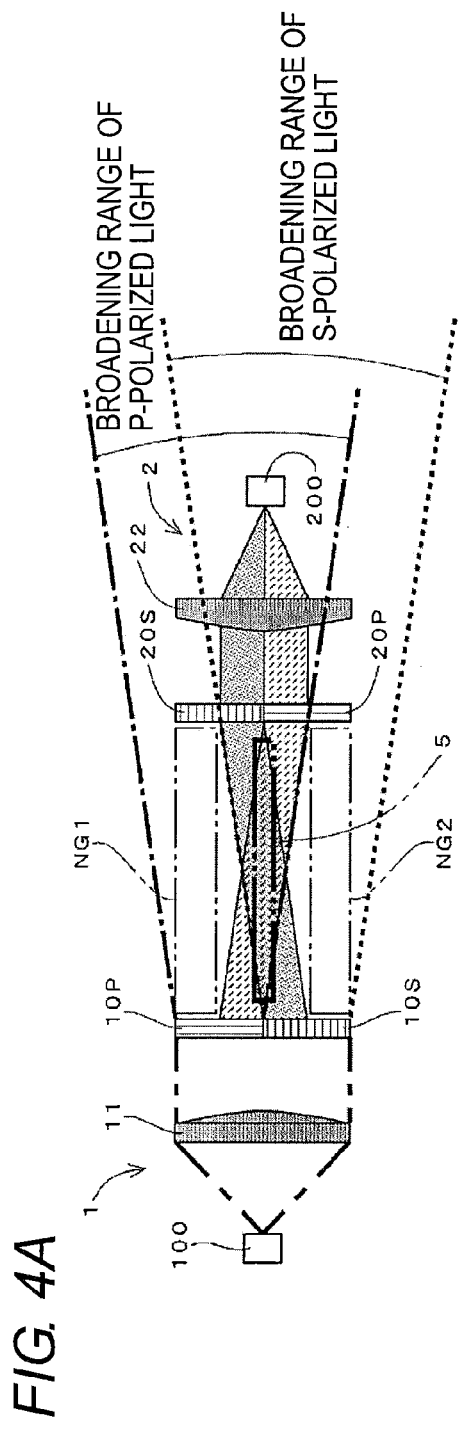
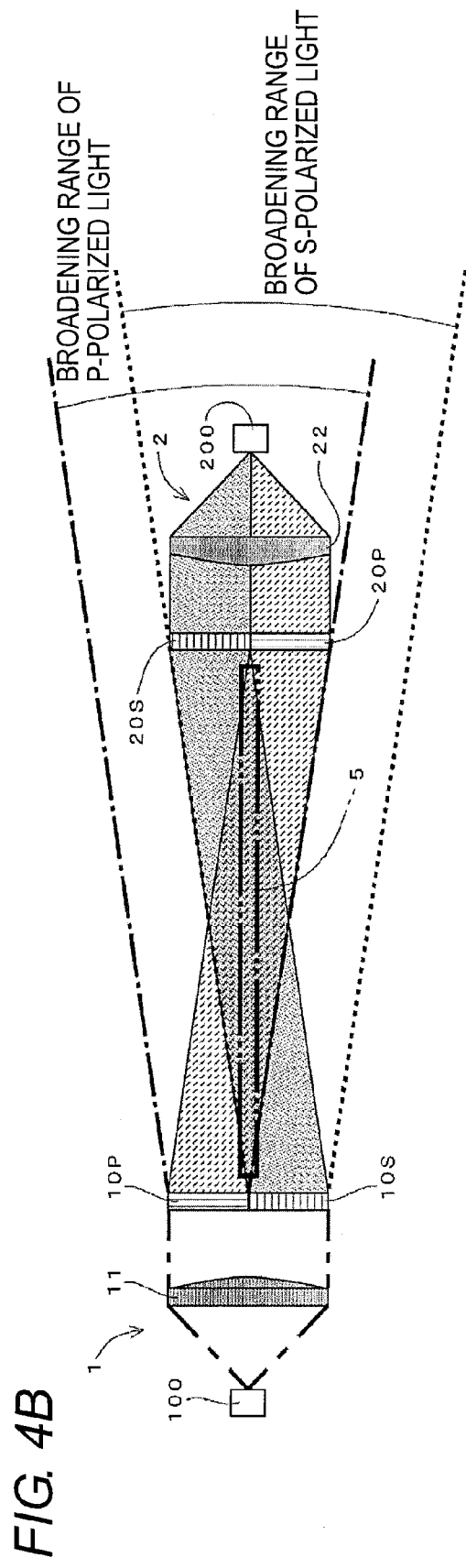
FIG. 4A
FIG. 4B

PHOTOELECTRIC SENSOR USED FOR DETECTION OF THIN OBJECTS

CROSS-REFERENCE TO RELATED PATENT APPLICATIONS

Japan Priority Application 2009-256903, filed Nov. 10, 2009 including the specification, drawings, claims and abstract, is incorporated herein by reference in its entirety.

BACKGROUND

1. Technical Field

The present invention relates to a photoelectric sensor used to detect an object, particularly to a photoelectric sensor suitable for use of detection of a thin object.

2. Related Art

In a photoelectric sensor that is used to detect a thickness portion of a thin object in a substrate conveying line or the like, since a complete light interception state is hardly generated depending on a detection target object, a detection signal is turned on based on a condition that an amount of received light is lower than a predetermined threshold.

In a conventional example concerning a disposition of this kind of sensor, as shown in FIG. 10, a phototransmitter 501 and an optical receiver 502 of a transmission type photoelectric sensor are disposed such that a detection target region is sandwiched therebetween, and a decrease of the amount of received light is detected when light traveling from the phototransmitter 501 toward the optical receiver 502 is partially intercepted by a substrate 503 (for example, see Japanese Unexamined Patent Publication No. 2009-216489). As shown in FIG. 11, the phototransmitter 501 and the optical receiver 502 are disposed while vertically deviated from each other, and the phototransmitter outputs the light such that the light obliquely traverses the detection target region (for example, see Japanese Unexamined Patent Publication No. 2007-258386).

In Japanese Unexamined Patent Publication Nos. 2009-216489 and 2007-258386, the substrate conveyed along a horizontal direction is detected in a predetermined position on a conveying path. Occasionally, the photoelectric sensor is used to detect vertical movement of the thin object. For example, in Japanese Unexamined Patent Publication No. 6-69323, a carrier in which a plurality of wafers are accommodated while arrayed in a vertical direction is vertically moved, and the wafers are sequentially put in an optical path of the transmission type photoelectric sensor to perform the detection, or a polarizing filter is attached to the optical receiver in order to prevent the incidence of the light reflected from the wafer on a stage higher than the detection target to the optical receiver.

In the example of FIG. 10, since a light interception amount depends on a thickness of the substrate 503, the detection is hardly performed when the substrate 503 is thinned. As shown in FIG. 12, depending on the disposition of the sensor, the light outputted from the phototransmitter 501 is reflected by a surface of the substrate 503 and is incident to the optical receiver 502. Therefore, occasionally the detection of the substrate 503 is obstructed.

When the optical path is set in the oblique direction like the example of FIG. 11, since a light interception state is generated by the surface of the substrate 503, it seems that the light interception amount can be increased to stably perform the detection. However, in the above disposition, the phototransmitter 501 differs from the optical receiver 502 in height, so that it is difficult to align the substrate 503 and the optical path with each other. In order to stably detect the substrate 503 in horizontal behavior, as shown in a region 500 of FIG. 11, it is necessary that a detection region having a width in which the substrate can be included be produced in a certain degree of height range. However, when the optical path is set obliquely, undetectable regions u and v are generated in the region 500 that should be the detection region.

In order to eliminate the undetectable regions u and v, another set of the phototransmitter and the optical receiver is disposed near the phototransmitter 501 and the optical receiver 502 with a positional relationship opposite to that of FIG. 11. However, in such a configuration, wiring becomes complicated to increase cost. Possibly the reflected light generated in the optical path of one of the sensors is incident to the optical receiver of the other sensor to degrade detection accuracy.

SUMMARY

Embodiments of the present invention improve to detect a thin target object.

In accordance with one aspect of the present invention, a photoelectric sensor including: a phototransmitter that outputs light toward a detection target region of an object; and an optical receiver that receives the light outputted from the phototransmitter, wherein a signal indicating that the object is detected is outputted in response to a decrease of an amount of light received by the optical receiver. The photoelectric sensor can be configured not only as a sensor in which the phototransmitter and the optical receiver respectively contain a light source and a light receiving element, but also as an optical fiber type photoelectric sensor. Moreover, an embodiment of the present invention can be applied to a transmission type photoelectric sensor as well as a reflection type photoelectric sensor.

In the phototransmitter of the photoelectric sensor according to an embodiment of the present invention, two kinds of light having different characteristics and that do not interfere with each other are outputted from two output regions into which the light transmitting surface is divided. In addition, the photoelectric sensor according to an embodiment of the present invention includes a pair of optical filters having a characteristic of selecting the two kinds of light and guiding the light to the optical receiver. The optical filters are disposed opposite to output regions of the pieces of light different from the pieces of light of a selecting target while located across a detection target region. Moreover, output directions of the two kinds of light are fixed such that whole surfaces of the first optical filters corresponding to the characteristics are irradiated with the two kinds of light from the phototransmitter when the first optical filters are disposed in a light transmitting surface while located away from each other by a predetermined distance or more.

According to the above configuration, when the optical filters are disposed while located away from the light transmitting surface by a predetermined distance or more, the two kinds of light outputted from the phototransmitter travel in the detection target region, the whole surface of the optical filters corresponding to the characteristics of the two kinds of light are irradiated with the two kinds of light, and the two kinds of light are incident to the optical receiver through the optical filters. The range, in which the light incident to the optical receiver travels, acts as the object detection region.

The detection regions by the two kinds of light obliquely traverse the detection target region and intersect each other in the detection target region. The detection regions intersect each other with the widths corresponding to the output regions of the pieces of corresponding light or the optical filters in the range from a boundary position between the output regions of the light transmitting surface to a boundary position between the optical filters, so that the detection regions can be distributed in the wide range centering around the intersection portion.

In the position that is opposite to the output region of each piece of light in the phototransmitter, the optical filter corresponding to the light whose characteristic differs from that of the light outputted from the region is disposed. Therefore, even if the light reflected from the surface of the object is guided to the optical receiver, the incidence of the reflected light to the optical receiver can be prevented.

In the photoelectric sensor according to a preferred aspect, an optical axis setting unit is provided in the phototransmitter, and the optical axis setting unit changes an optical axis direction of the light from a light source to the output regions of the two kinds of light to a direction in which the optical filters are disposed such that the light obliquely traverses the detection target region toward the positions in which the optical filters are disposed. With such a configuration, even if the distance between the light transmitting surface and the optical filter is not lengthened, the whole surfaces of the corresponding optical filters can be irradiated with the two kinds of light to increase a degree of freedom of the distance set between the light transmitting surface and the optical filter. Therefore, the photoelectric sensor can deal with the detection of the objects having various widths.

In the photoelectric sensor according to the preferred aspect, the pair of first optical filters is integrally provided in the optical receiver while arrayed in parallel in a light receiving surface of the optical receiver. The optical receiver is disposed opposite to the phototransmitter along with the optical filters to receive the pieces of light passing through the optical filters. Therefore, the sensor in which the detection accuracy is largely improved can be provided as the transmission type photoelectric sensor.

Further, in the above aspect, the optical receiver is configured to individually collect the pieces of light passing through the optical filters and individually guide the pieces of collected light to light receiving elements. With such a configuration, the object is detected based on the decrease of the amount of received light in one of the light receiving elements, so that the stable detection can be performed even if the object of the detection target is biased to one of the detection regions by the two kinds of light.

In another preferred aspect, the phototransmitter and the optical receiver are provided in the same housing on an assumption that a return reflector plate is provided on an opposite side to the detection target region with respect to the pair of optical filters; and in the housing, a surface that is opposite to the detection target region acts as a light transmitting surface and a light receiving surface. In the pieces of light outputted from the light transmitting unit to pass through the optical filters, the optical receiver receives the pieces of light that are returned through the optical filters after being reflected by the return reflector plate.

According to the above aspect, the sensor that can stably perform the detection in the wide range can be provided as the reflection type photoelectric sensor.

In yet another preferred aspect, two kinds of light vibrated in specific directions and having different vibration directions are outputted from a light transmitting surface of the phototransmitter. Moreover, a pair of polarizing plates is disposed as the pair of optical filters opposite to the output regions of the pieces of light that are not the selection target while located across a detection target region, the pair of polarizing plates being directed to the selection of the vibration directions of the two kinds of light.

According to this aspect, the detection can stably be performed by utilizing the characteristic of the light that is vibrated in a specific direction.

According to still another preferred aspect, two kinds of light having different wavelength ranges are outputted from a light transmitting surface of the phototransmitter. The pair of optical filters is directed to the selection of the wavelength ranges corresponding to the two kinds of light; and the pair of optical filters is disposed opposite to the output regions of the pieces of light that are not the selection target while located across a detection target region.

According to this aspect, the detection can stably be performed by utilizing the characteristics of the pieces of light having the different wavelength ranges.

In the phototransmitter according a preferred aspect, a pair of optical filters including characteristics identical to those of the pair of optical filters is arrayed along the light transmitting surface so as to be opposite to the optical filters having different characteristics, the optical filters being located across the detection target region; and the pieces of the light passing through the first optical filters of the phototransmitter are outputted as the two kinds of light. In this manner, by using the two pairs of optical filters having different characteristics, the two kinds of light are stably outputted from the phototransmitter, and the light that obliquely traverses the detection target region to reach the position where the optical filter corresponding to the characteristic of the light is disposed can be guided to the optical receiver.

In embodiments of the present invention, the two kinds of light having different characteristics are outputted from two regions into which the light transmitting surface is divided, and the two kinds of light does not interfere with each other. The detection regions by the two kinds of light obliquely traverse the detection target region and intersect each other in the detection target region, so that the object can be detected in the wide range of the detection target region.

The light reflected from the output region is obstructed by the optical filter disposed opposite to the output region of each piece of light of the phototransmitter in the detection target region, so that the degradation of detection accuracy caused by the light reflected from the surface of the detection target can be prevented.

Accordingly, in an embodiment of the present invention, the detection can stably be performed irrespective of the variations of the width and position of the thin detection target object or the influence of the light reflected from the detection target object.

BRIEF DESCRIPTION OF THE DRAWINGS

FIGS. 3A and 3B each show a relationship between broadening ranges of pieces of light from a phototransmitter and pieces of light incident to an optical receiver;

FIGS. 4A and 4B each show a relationship between the broadening ranges of the pieces of light from the phototransmitter and the pieces of light incident to the optical receiver when an optical axis is not adjusted by a prism;

DETAILED DESCRIPTION

Figure 1A:
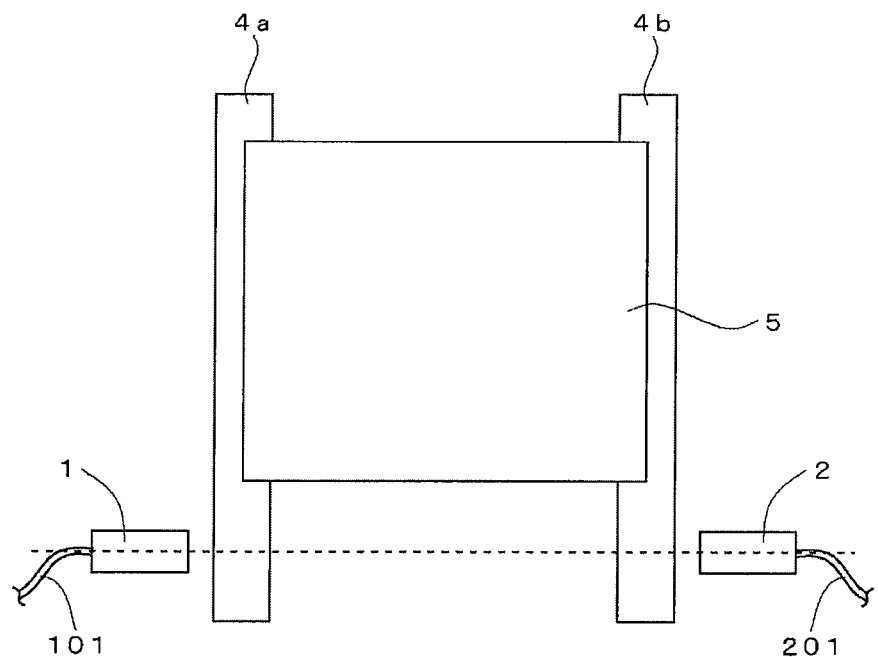
FIGS. 1A and 1B show a usage example of a transmission type photoelectric sensor.
Figure 1B:
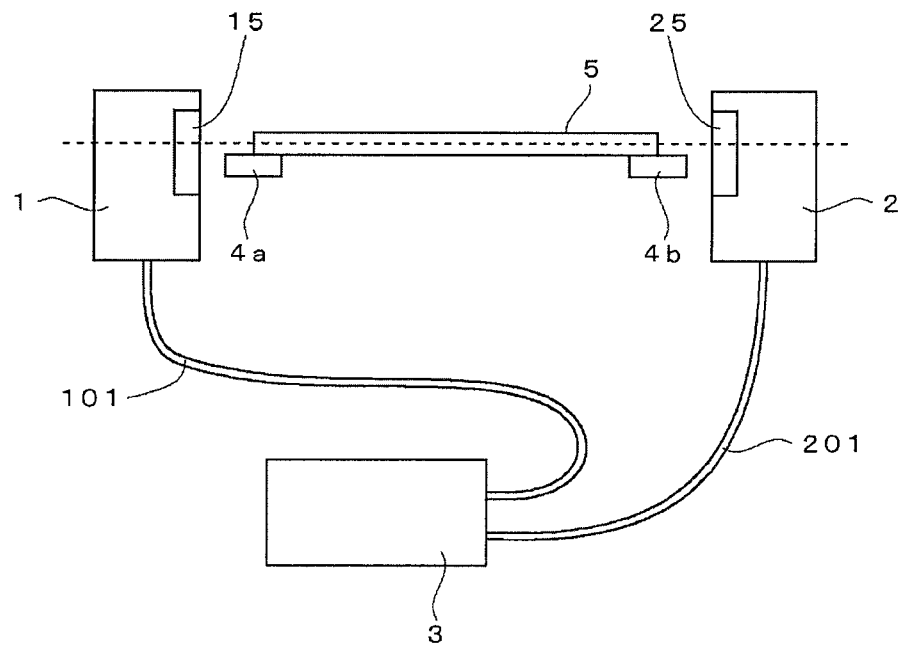

FIGS. 1A and 1B show a usage example of a transmission type photoelectric sensor applied with the present invention.

The photoelectric sensor of this embodiment includes a phototransmitter 1, an optical receiver 2, and a signal processing device 3. A light transmitting element and a light receiving element are accommodated in the signal processing device 3, and a light guide path is provided between the phototransmitter 1 and optical receiver 2 and the signal processing device 3 by optical fibers 101 and 201.

The photoelectric sensor of this embodiment is used to detect a substrate 5 that is conveyed by conveyers 4a and 4b, the phototransmitter 1 is disposed on the side of the conveyer 4a while the optical receiver 2 is disposed on the side of the conveyer 4b, and the conveyers 4a and 4b are disposed opposite to each other.

In the phototransmitter 1, the light guided through the optical fiber 101 is outputted from a light transmitting window 15 of a front face. In the optical receiver 2, the light inputted from a light receiving window 25 is collected, and the collected light is guided to the light receiving element in the signal processing device 3 through the optical fiber 201. In the signal processing device 3, an output signal of the light receiving element is processed to detect an amount of received light while light emitting operation of the light transmitting element is controlled, and the amount of received light is checked against a determination threshold.

A detection signal outputted from the signal processing device 3 becomes an off-state while the detected amount of received light is not lower than the threshold. When the light from the phototransmitter 1 to the optical receiver 2 is intercepted by the substrate 5 and the amount of received light becomes lower than the threshold, the signal processing device 3 sets the detection signal to an on-state.

In this embodiment, a detection region larger than that of the conventional example is generated in a space between the phototransmitter 1 and the optical receiver 2. Hereinafter, a configuration of this optical system will be described in detail.

Figure 2:
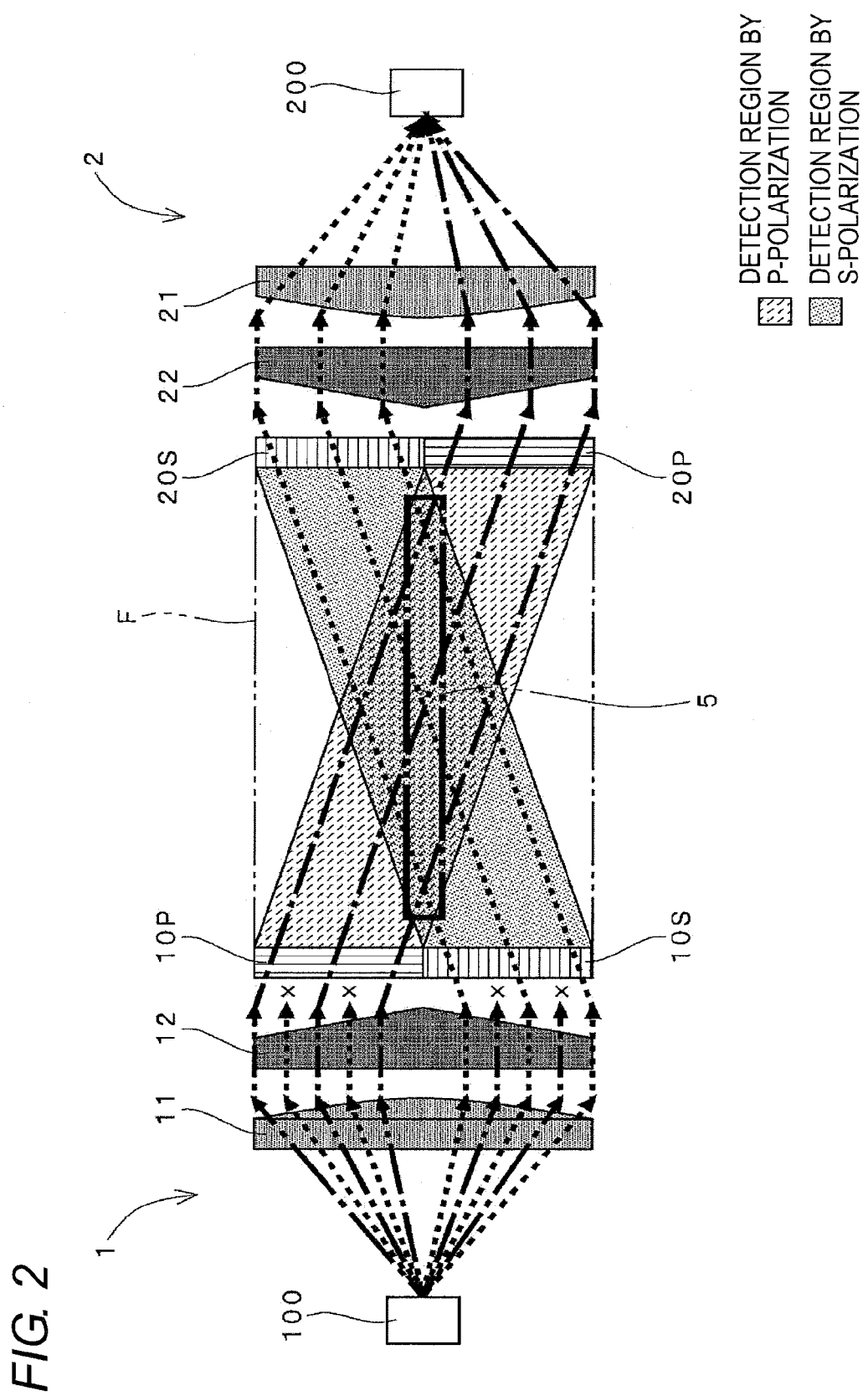
FIG. 2 shows a configuration example and a detection principle of an optical system of the transmission type photoelectric sensor.

FIG. 2 shows a configuration example of the optical system of the above-described photoelectric sensor. Since this configuration can also applied to a sensor other than the optical fiber type sensor, the optical fibers 101 and 201 are not shown in FIG. 2, but a light transmitting element 100 is included in the configuration on the side of the phototransmitter 1 while a light receiving element 200 is included in the configuration on the side of the optical receiver 2.

A collimate lens 11 and a prism 12 are incorporated in the phototransmitter 1 of this embodiment, and two polarizing plates 10P and 10S are vertically arrayed in front of the prism 12. The upper polarizing plate 10P is used for P-polarization, and the lower polarizing plate 10S is used for S-polarization. The polarizing plates 10P and 10S are mounted on a surface of the light transmitting window 15 shown in FIG. 1B, and the surfaces of the polarizing plates 10P and 10S constitute a substantial light transmitting surface. Hereinafter, the polarizing plate 10P is referred to as a P-polarizing plate 10P, and the polarizing plate 10S is referred to as an S-polarizing plate 10S.

In the optical receiver 2, a prism 22 and a lens 21 are provided in order to collect the light, and two polarizing plates 20S and 20P are vertically arrayed in front of the prism 22. The polarizing plates 20P and 20S are mounted on the surface of the light receiving window 25 shown in FIG. 1B such that the polarizing plate 20S for the S-polarization is located above while the polarizing plate 20P for the P-polarization is located below. Therefore, the polarizing plates 20P and 20S constitute a substantial light receiving surface. Hereinafter, the polarizing plate 20S is referred to as an S-polarizing plate 20S, and the polarizing plate 20P is referred to as a P-polarizing plate 20P.

Dimensions of the light transmitting window 15 and light receiving window 25 of the phototransmitter 1 and optical receiver 2 are unified, and the polarizing plates 10P, 10S, 20P, and 20S are formed into a rectangular shape having dimensions half each window surface. Therefore, when the phototransmitter 1 and the optical receiver 2 are disposed opposite to each other, the P-polarizing plate 10P on the side of the phototransmitter 1 and the S-polarizing plate 20S on the side of the optical receiver 2 are located at the same level, and the S-polarizing plate 10S on the side of the phototransmitter 1 and the P-polarizing plate 10P on the side of the optical receiver 2 are located at the same level.

The light transmitting element 100 outputs the pieces of light vibrated in various directions. After the collimate lens 11 converts the output light into parallel light, the prism 12 changes an optical axis direction in a range where the P-polarizing plate 10P is irradiated with the light to an obliquely downward direction, and the prism 12 changes an optical axis direction in a range where the S-polarizing plate 10S is irradiated with the light to an obliquely upward direction. Therefore, a vibration direction of the light passing through the P-polarizing plate 10P is unified in a perpendicular direction, and a vibration direction of the light passing through the S-polarizing plate 10S is unified in a horizontal direction. The vibration direction of the light outputted from the phototransmitter 1 is limited to these two directions.

The actual pieces of light that are polarized by and outputted from the polarizing plates 10P and 10S travel while broadening to a certain level of range depending on characteristics of the lens 11 and prism 12. FIG. 2 shows a range where the light that reaches a light receiving surface of the optical receiver 2 to be incident to the optical receiver 2 travels in each of the P-polarization and S-polarization by different patterns. A main traveling direction of the P-polarized light is expressed by an alternate long and short dash line, and a main traveling direction of the S-polarized light is expressed by a dotted line.

As shown by the patterns, the alternate long and short dash line, and the dotted line of FIG. 2, in the photoelectric sensor of this embodiment, the light that is guided to the range corresponding to the P-polarizing plate 20P by traveling in the obliquely downward direction through the P-polarizing plate 10P and the light that is guided to the range corresponding to the S-polarizing plate 20S by traveling in the obliquely upward direction through the S-polarizing plate 10S are incident to the optical receiver 2. The incident light is collected by the prism 22 and the lens 21 and guided to the light receiving element 200.

When the substrate 5 that is the detection target enters a space F (hereinafter referred to as a detection target region F) between the phototransmitter 1 and the optical receiver 2, among the light incident to the optical receiver 2, the light from the P-polarizing plate 10P is intercepted by an upper surface of the substrate 5, and the light from the S-polarizing plate 10S is intercepted by a lower surface of the substrate 5. Accordingly, the light incident to the optical receiver 2 is largely reduced. Along with this, a signal value of the amount of received light, outputted from the light receiving element 200, becomes lower than the threshold to set the detection signal to the on-state.

When the substrate 5 enters the detection target region F, occasionally the pieces of light from the polarizing plates 10P and 10S are reflected by the surface of the substrate 5 and guided to the optical receiver 2. However, because the polarizing plates having characteristics unsuitable to the vibration directions of the pieces of light are provided in positions that the pieces of reflected light reach, the pieces of reflected light can be prevented from being incident to the optical receiver 2. Therefore, the disturbance in the detection of the substrate 5 can be avoided due to the light reflected from the surface of the substrate 5.

In the example of FIG. 2, the amount of light incident to the optical receiver 2 is reduced not only at a point where the patterns corresponding to the two kinds of light intersect each other, but also when the substrate 5 is located in the range where only the pattern corresponding to one of the two kinds of light is expressed. Thus, the range expressed by each pattern in FIG. 2 corresponds to the range where the object (substrate 5) can be detected. Hereinafter, the ranges expressed by the patterns are referred to as a "detection region by P-polarization" and "detection region by S-polarization", respectively, and the both are collectively referred to as a "detection region".

Referring to FIG. 2, the detection region by P-polarization and the detection region by S-polarization obliquely traverse the detection target region F and interest each other in the detection target region F. The intersection portion is generated in a range from a boundary position between the polarizing plates 10P and 10S on the side of the phototransmitter 1 to a boundary position between the polarizing plates 20P and 20S on the side of the optical receiver 2. Since any detection region has a width corresponding to the polarizing plate, the detection region is distributed over the total width of the detection target region F at any level in a height range (from the highest position of the intersection portion to the lowest position of the intersection portion) corresponding to the intersection portion. Therefore, when the substrate 5 is included in the height range corresponding to the intersection portion, the amount of received light of the light receiving element 200 is reduced by the interceptions of both surfaces of the substrate 5, so that the substrate 5 can stably be detected.

The detection regions where the two kinds of the P-polarized light and S-polarized light are used are horizontally distributed even in the position above and below the height range corresponding to the intersection portion. Therefore, as shown in FIG. 2, when the width of the detection target region F is set according to the width of the substrate 5, the light interception state can be generated in the detection region by the substrate 5, even if the substrate 5 is located at any level in the detection target region F.

The photoelectric sensor is not limited to the usage example shown in FIGS. 1A and 1B, but the photoelectric sensor may be applied to the use in detecting the conveyance of the target objects having various widths. In such cases, the position of the target object is not fixed in the width direction, but the target object may be biased onto the side of the phototransmitter 1 or the side of the optical receiver 2. When the target object falls within the height range corresponding to the intersection portion of the detection regions, the target object can stably be detected irrespective of the variation of the position in the width direction.

In order to set the detection region distribution to the state shown in FIG. 2, it is necessary that the whole surfaces of the polarizing plates 20P and 20S corresponding to the characteristics of the P-polarized light and S-polarized light be irradiated with the P-polarized light and S-polarized light. In this embodiment, even if a distance between the phototransmitter 1 and the optical receiver 2 is short, the irradiation condition can be satisfied by setting the optical axis direction of each piece of light to the oblique direction. Therefore, the photoelectric sensor of this embodiment can easily deal with the change of the detection distance.

FIGS. 3A and 3B each show a broadening range (alternate long and short dash line) of the P-polarized light passing through the polarizing plate 10P and a broadening range (dotted line) of the S-polarized light passing through the polarizing plate 10S along with the traveling state of the light incident to the optical receiver 2 when long and short distances are set between the phototransmitter 1 and the optical receiver 2.

In the example of FIG. 3A, the broadening ranges of the P-polarized light and S-polarized light just correspond to the light receiving surface in the position of the light receiving surface. In the example of FIG. 3B, since the distance between the phototransmitter 1 and the optical receiver 2 is set longer than the example of FIG. 3A, a broadening degree of each piece of light in the position of the light receiving surface is sufficiently larger than the light receiving surface.

As shown in FIGS. 3A and 3B, when the whole light receiving surface of the optical receiver 2 is irradiated with each of the pieces of light from the polarizing plates 10P and 10S, the light that is the selection target is securely accepted by the whole surfaces of the polarizing plates 20P and 20S on the side of the optical receiver 2 and received by the light receiving element 200. Therefore, dimensions of each detection region can be stabilized. As shown in FIG. 3A, the whole light receiving surface can be irradiated with each piece of light from a stage of the short distance between the phototransmitter 1 and the optical receiver 2 by setting the optical paths of the S-polarized light and P-polarized light obliquely upward and obliquely downward. Accordingly, the photoelectric sensor of this embodiment can deal with both the short-distance detection and the long-distance detection.

Even if the phototransmitter 1 and the optical receiver 2 come closer to each other than the state shown in FIG. 3A, the detection region having the dimensions similar to those of FIGS. 3A and 3B can be secured on the condition that the whole surfaces of the polarizing plates 20P and 20S on the side of the optical receiver 2 are irradiated with the pieces of light from the polarizing plates 10P and 10S, respectively.

FIGS. 4A and 4B each show a relationship between the broadening ranges of the pieces of light and the pieces of light incident to the optical receiver 2 when the pieces of light are outputted without an optical axis being adjusted by a prism 12. In the example of FIG. 4A, the phototransmitter 1 and the optical receiver 2 are disposed while being away from each other by the same distance as the example of FIG. 3A. In the example of FIG. 4B, the phototransmitter 1 and the optical receiver 2 are disposed while being away from each other by the same distance as the example of FIG. 3B.

Even if the pieces of light travel from the polarizing plates 10P and 10S without inclining the pieces of light, the whole light receiving surface can be irradiated with the pieces of light when a considerable distance is set between the phototransmitter 1 and the optical receiver 2 as shown in FIG. 4B. Therefore, the configuration example of FIGS. 4A and 4B can also deal with the long-distance detection.

However, when the distance between the phototransmitter 1 and the optical receiver 2 is shortened, the whole surfaces of the polarizing plates 20P and 20S cannot be irradiated with the P-polarized light and S-polarized light as shown in FIG. 4A. Therefore, the detection region is reduced, and a region where the substrate 5 cannot be detected is generated in the detection target region F as expressed by rectangular frames NG1 and NG2 of FIG. 4A.

Accordingly, in order to deal with both the short-distance detection and the long-distance detection, as shown in FIG. 2 and FIGS. 3A and 3B, it is necessary to adopt the method for outputting the two kinds of light toward the obliquely upward direction and the obliquely downward direction. When the method is adopted, the configuration of the optical system is not limited to the examples of FIG. 2 and FIGS. 3A and 3B, but the optical system may be configured as shown in FIGS. 5 to 9.

Hereinafter, embodiments will be described with reference to the drawings. In each embodiment, the configuration similar to that of the previous embodiment is designated by the same reference numeral, and the description thereof is not given or simplified.

The two kinds of light used to detect the object is not limited to the light whose polarization direction is aligned, but the pieces of light having different wavelength ranges can also be used. In embodiments of FIGS. 5 and 6, the detection by the principle similar to that of FIG. 2 is performed using the pieces of light having the different wavelength ranges.

Figure 5:
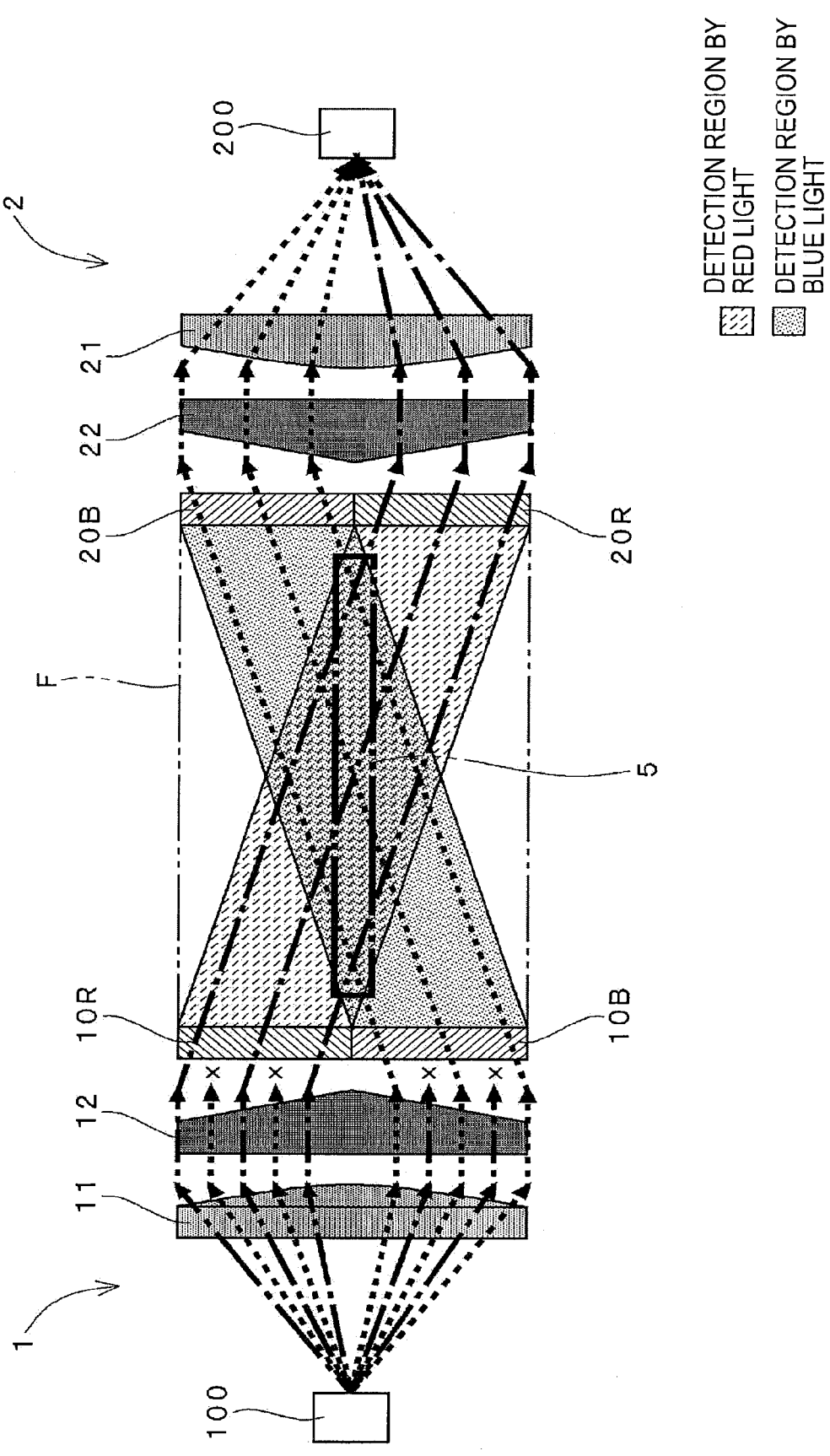
FIG. 5 shows another configuration example and a detection principle of the optical system.

In the embodiment shown in FIG. 5, red light extracting color filters 10R and 20R are used instead of the P-polarizing plates 10P and 20P of the phototransmitter 1 and optical receiver 2, and blue light extracting color filters 10B and 20B are used instead of the S-polarizing plates 10S and 20S. A light transmitting element that outputs white light is used as the light transmitting element 100.

Accordingly, the red light is outputted obliquely downward from an upper half region of the light transmitting surface of the phototransmitter 1, and the blue light is outputted obliquely upward from a lower half region. In the pieces of color light, the red light that is guided to the range where the color filter 20R of the optical receiver 2 is disposed and the blue light that is guided to the range where the color filter 20B is disposed are guided to the light receiving element 200.

Figure 6:
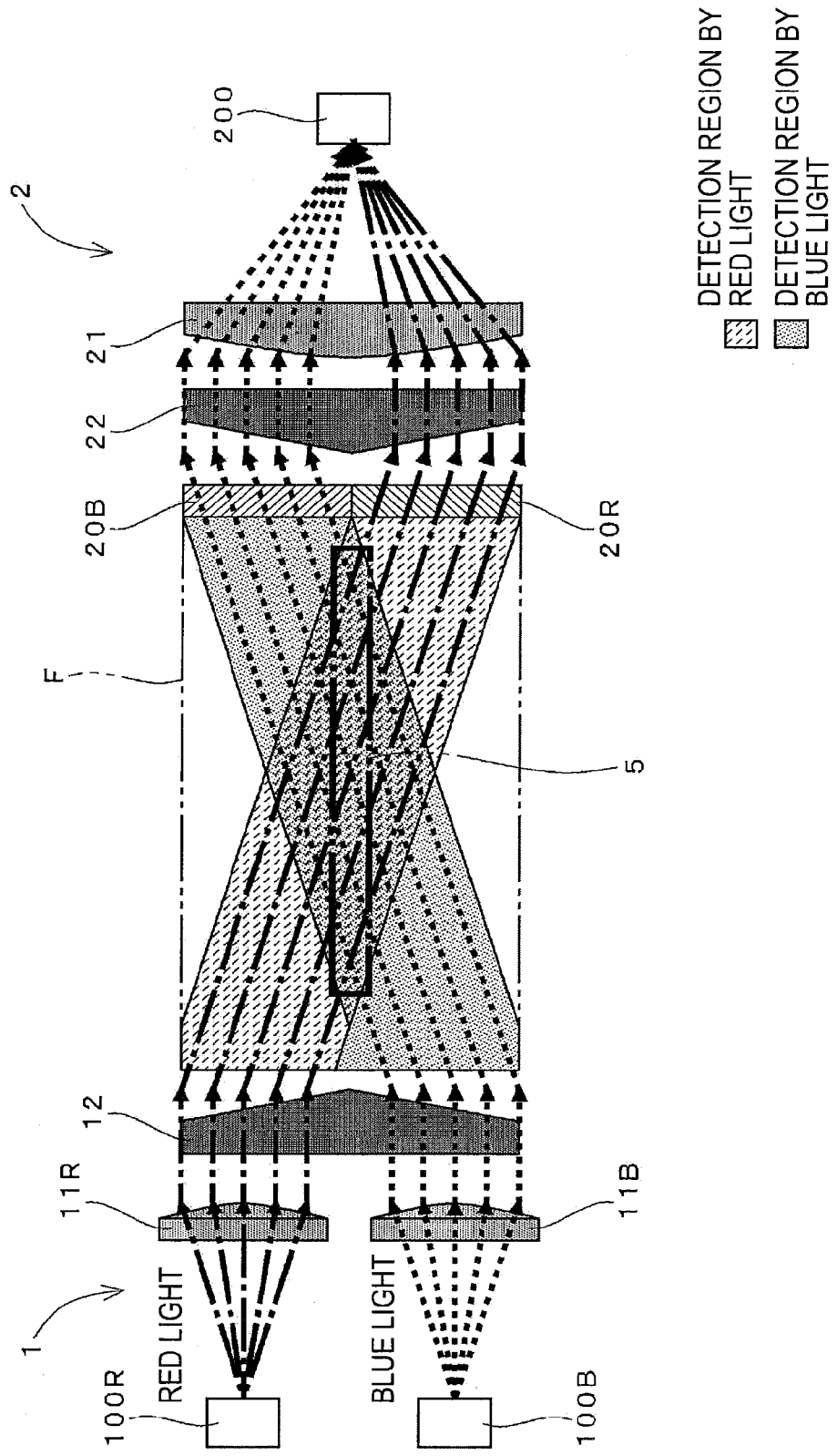
FIG. 6 shows still another configuration example and a detection principle of the optical system.

In the embodiment shown in FIG. 6, a light transmitting element 100R that outputs the red light and a light transmitting element 100B that outputs the blue light are provided in the phototransmitter 1 without providing the color filters 10R and 10B, and the pieces of light from the light transmitting elements 100R and 100B are guided to the prism 12 through the collimate lens 11R and 11B, respectively. In such cases, the light transmitting elements 100R and 100B are accommodated in the signal processing device 3, and the pieces of light can be guided to the phototransmitter 1 through optical fibers, respectively.

In the embodiment of FIG. 6, in the phototransmitter 1, the light transmitting elements 100R and 1008 are provided for the two kinds of light, and the pieces of light guided from the light transmitting elements 100R and 1006 are outputted without being filtered, so that intensity of the output light can be enhanced to stably detect the object.

Even in the example of FIG. 2 in which the polarizing plate is used and the example of FIG. 5 in which the color filter is used, the light source can be divided in each output direction, and therefore the intensity of the output light can be enhanced to improve the stability of the detection.

Figure 7:
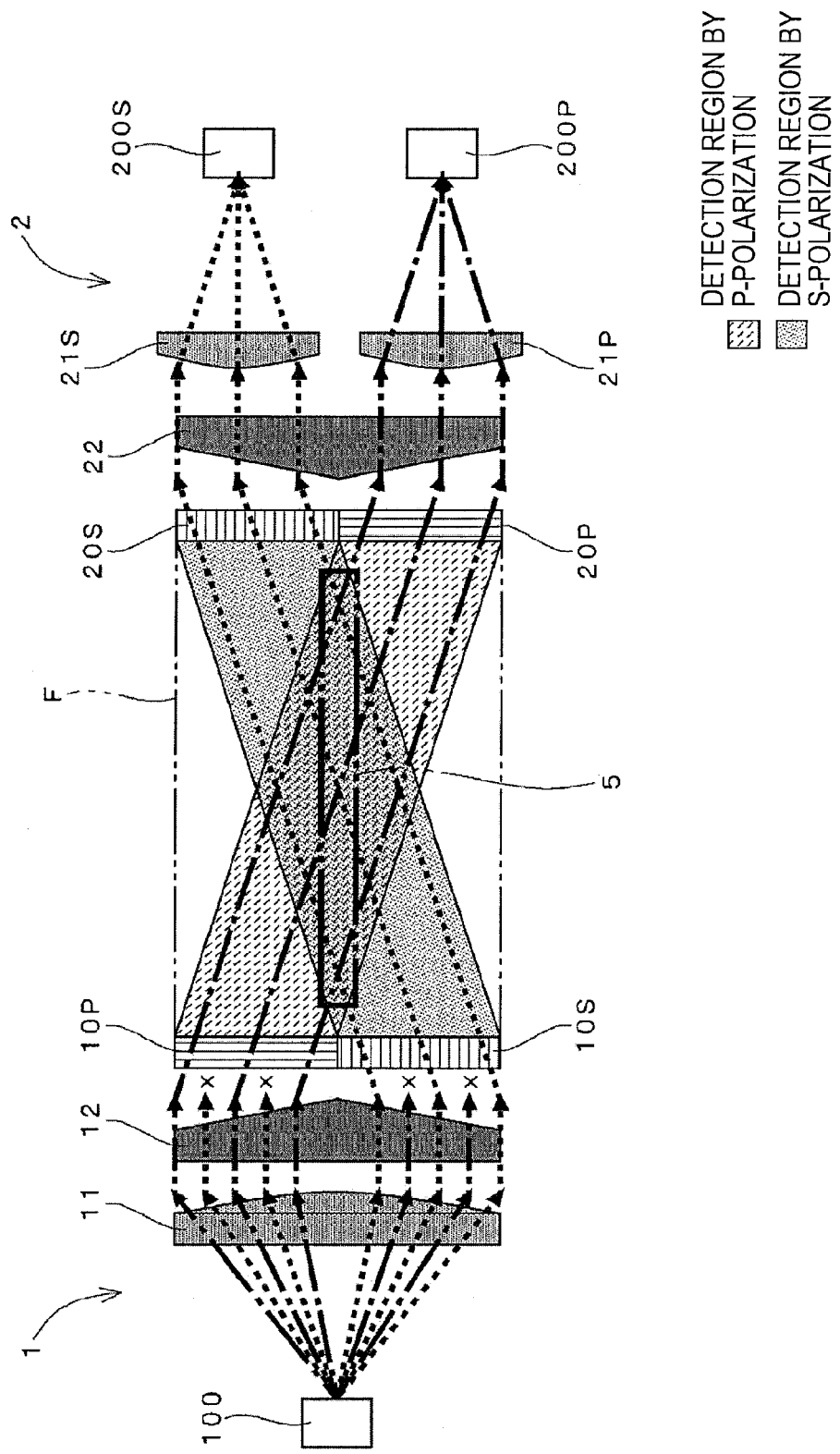
FIG. 7 shows yet another configuration example and a detection principle of the optical system.

In the embodiment shown in FIG. 7, similarly to the embodiment of FIG. 2, the detection region is set using the polarizing plates 10P, 10S, 20P, and 20S. In this embodiment, two collective lenses 21P and 21S are provided in the optical receiver 2 to individually collect the P-polarized light and the S-polarized light, and the collected P-polarized light and the collected S-polarized light are guided to light receiving elements 200P and 200S, respectively.

Although not shown in FIG. 7, in this embodiment, the signal processing device 3 individually checks the amounts of received light obtained by the light receiving elements 200P and 200S against the threshold, and the detection signal is set to the on-state when at least one of the amounts of received light is lower than the threshold.

According to the above-described configuration, even when the object enters only one of the detection regions by P-polarization and the detection region by S-polarization, the object can be detected based on the reduction of the amount of received light in the detection region. Therefore, the detection sensitivity can be enhanced so that even a small object can be accurately detected.

When the detection is performed using the two kinds of color light as shown in the examples of FIGS. 5 and 6, each piece of color light is guided to the individual light receiving element similarly to the example of FIG. 7, and the checking processing of the amount of received light can be performed in each light receiving element.

Figure 8:
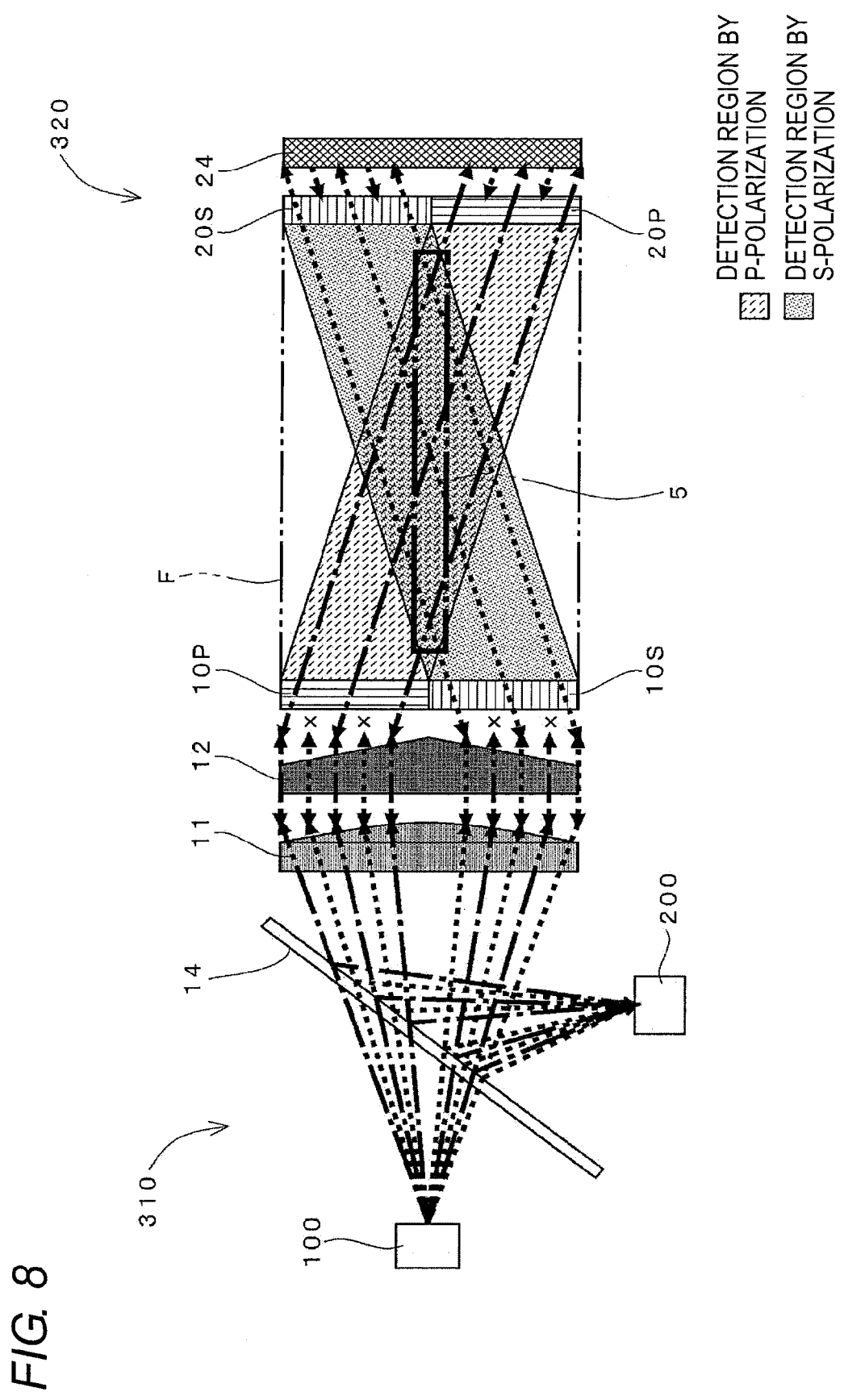
FIG. 8 shows a configuration example and a detection principle of an optical system of a reflection type photoelectric sensor.
Figure 9:
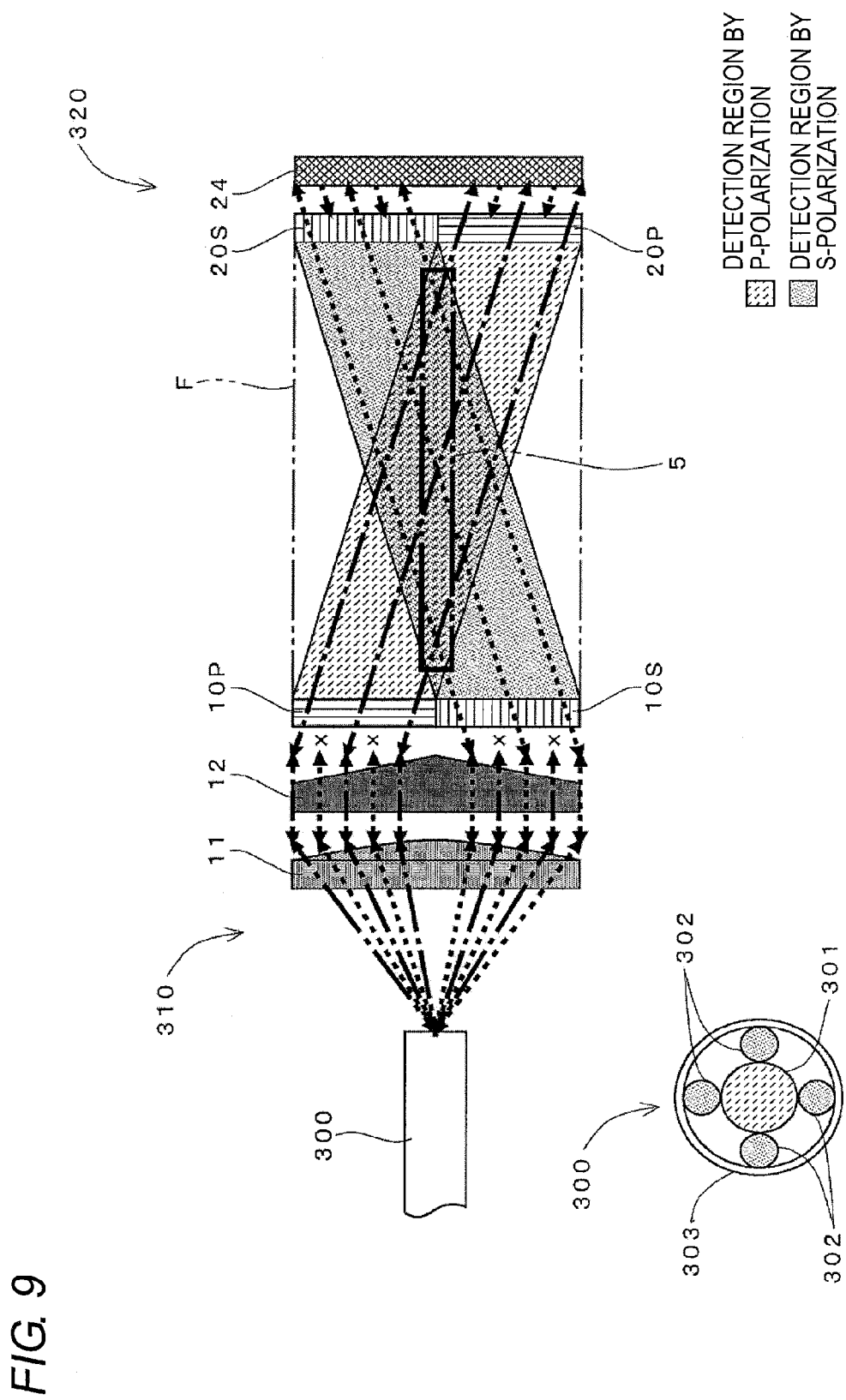
FIG. 9 shows another configuration example and a detection principle of the optical system of the reflection type photoelectric sensor.
Figure 10:
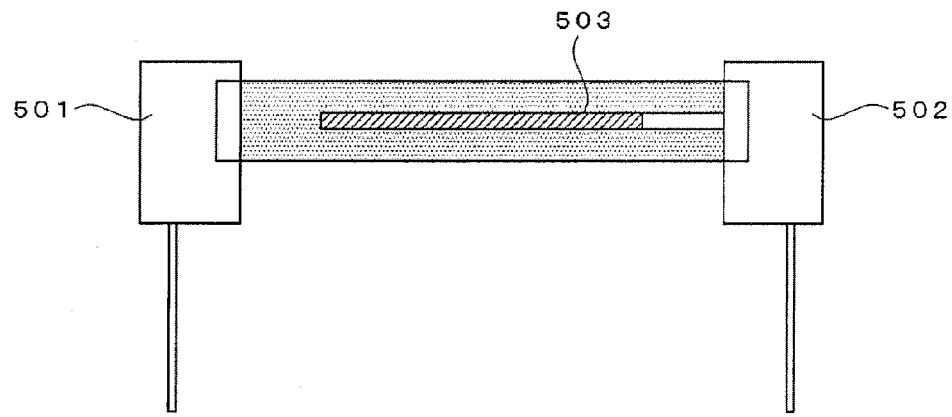
FIG. 10 shows an example of a method for detecting a thin target with a conventional photoelectric sensor.
Figure 11:
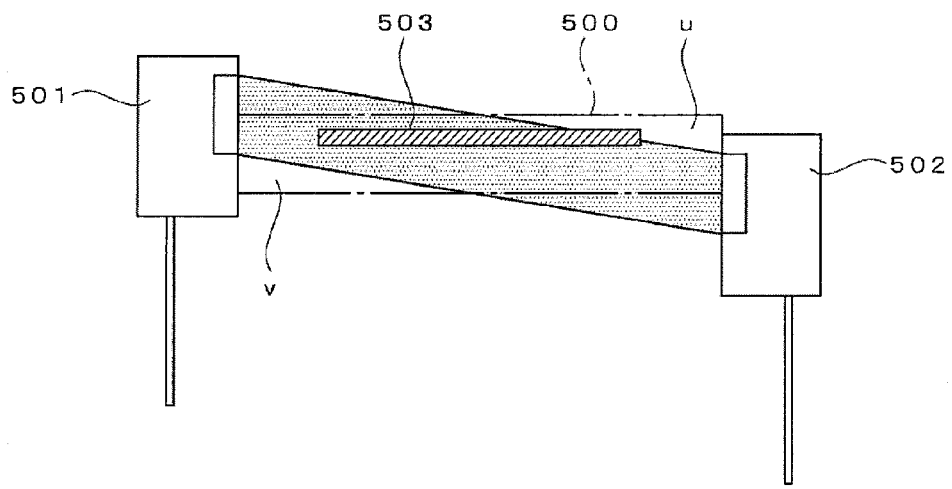
FIG. 11 shows another example of the method for detecting the thin target with the conventional photoelectric sensor.
Figure 12:
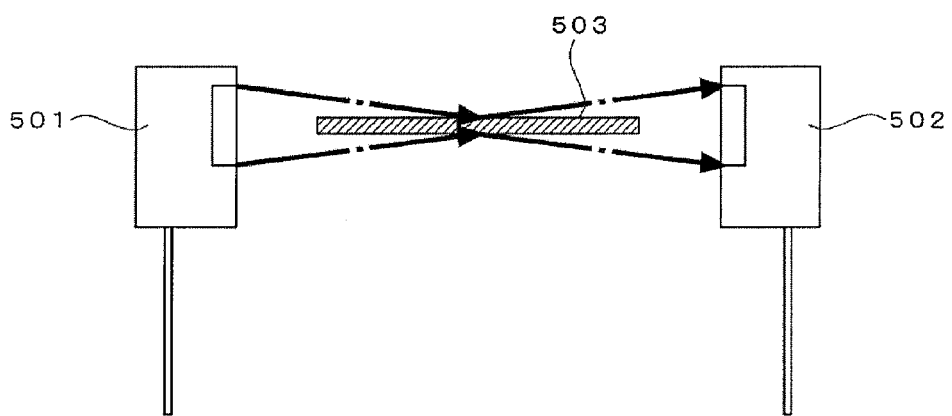
FIG. 12 shows an influence of reflected light.

FIGS. 8 and 9 show configuration examples an optical system of a reflection type photoelectric sensor.

The photoelectric sensor of the embodiment of FIG. 8 includes a sensor head 310 and a mirror unit 320. The light transmitting element 100 and the light receiving element 200 are accommodated in the sensor head 310. The mirror unit 320 includes a return reflector plate 24. The P-polarizing plate 10P and the S-polarizing plate 10S are disposed in front of the sensor head 310 in the state similar to that of the phototransmitter 1 of this embodiment of FIG. 2. The prism 12 and the collimate lens 11 are disposed in the sensor head 310 in the state similar to that of the phototransmitter 1 of this embodiment of FIG. 2, and a half mirror 14 is provided at the back of the collimate lens 11.

In the mirror unit 320, the S-polarizing plate 20S and the P-polarizing plate 20P are vertically arrayed in the whole surface of a holder (not shown) in which the return reflector plate 24 is fitted. When the mirror unit 320 and the sensor head 310 are disposed opposite to each other, the P-polarizing plate 10P of the sensor head 310 and the S-polarizing plate 20S of the mirror unit 320 are disposed at the same level, and the S-polarizing plate 10S of the sensor head and the P-polarizing plate 20P of the mirror unit are disposed at the same level.

In the above-described configuration, the light transmitting element 100 outputs pieces of light vibrated in various directions. The pieces of light are guided to the collimate lens 11 through the half mirror 14 and changed into the pieces of light along the horizontal direction. The P-polarized light traveling obliquely downward and the S-polarized light traveling obliquely upward are outputted by the prism 12 and the polarizing plates 10P and 10S.

In this embodiment as well, the sensor head 310 and the mirror unit 320 are disposed while being away from each other by the distance similar to the distance between the phototransmitter 1 and the optical receiver 2 of FIG. 3A, which allows the whole surfaces of the two polarizing plates 20P and 20S in the mirror unit 320 to be irradiated with the pieces of light from the polarizing plates 10P and 10S. In the pieces of irradiation light, the P-polarized light with which the polarizing plate 20P is irradiated and the S-polarized light with which the polarizing plate 20S is irradiated are guided to the return reflector plate 24.

The return reflector plate 24 has a function of reflecting the irradiation light to an irradiation direction, and vibration regularity of the light collapses by the reflection. Therefore, the pieces of reflected light are vibrated in various directions. In the pieces of light reflected toward the polarizing plate 20P, the P-polarized light travels toward the polarizing plate 10P on the side of the sensor head 310 through the polarizing plate 20P, and the P-polarized light is incident to the sensor head 310 through the polarizing plate 10P. In the pieces of light reflected toward the polarizing plate 20S, the S-polarized light travels toward the polarizing plate 10S on the side of the sensor head 310 through the polarizing plate 20S, and the S-polarized light is incident to the sensor head 310 through the polarizing plate 10S.

The light incident to the sensor head 310 is guided to the light receiving element 200 through the light half mirror 14 after being collected by the prism 12 and the lens 11. Therefore, a range where the light reciprocating between the sensor head 310 and the mirror unit 320 travels constitutes the detection region, and the substrate 5 can be detected in the range similar to that of the transmission type photoelectric sensor shown in FIG. 2.

FIG. 9 shows a second configuration example of the reflection type photoelectric sensor.

In this embodiment, the mirror unit 302 is similar to that of the example of FIG. 8. However, the half mirror 14, the light transmitting element 100, and the light receiving element 200 are not provided in the sensor head 310, and a coaxial type optical fiber 300 is drawn from the signal processing device 3.

The optical fiber 300 is disposed while a leading end of the optical fiber 300 is aligned with a focal position of the lens 11. As shown in an enlarged view on the lower left of FIG. 9, in the optical fiber 300, a plurality of light receiving fibers 302 are disposed around a light transmitting fiber 301 having a large diameter, and the light receiving fibers 302 and the light transmitting fiber 301 are fixed by a coating material 303.

The light outputted from the light transmitting element 100 (not shown in FIG. 9) of the signal processing device 3 is guided to the sensor head 310 by the light transmitting fiber 301 and outputted to the mirror unit 320 in the principle similar to that of the example shown in FIG. 8. The reflected light is returned from the mirror unit 320 onto the side of the sensor head 310 in the principle similar to that of the example shown in FIG. 8.

The light returned to the sensor head 310 is collected by the prism 12 and the lens 11 and guided to the optical fiber 300, and the light is incident to the light receiving fiber 302. The light incident to the light receiving fiber 302 is guided to the light receiving element 200 (not shown in FIG. 9) of the signal processing device 3.

In the embodiments of FIGS. 8 and 9 of the reflection type photoelectric sensor, since the polarizing plates 10P, 10S, 20P, and 20S select the light four times while the light reciprocates between the sensor head 310 and the mirror unit 320, a ratio of the amount of received light to the amount of output light becomes smaller than that of the transmission type photoelectric sensor. However, for example, the light interception state can sufficiently be detected by the method for enhancing the light emission intensity of the light transmitting element. When the configuration similar to that of FIGS. 8 and 9 is implemented using the color filters 10R, 10B, 20R, and 20B shown in FIG. 5 instead of the polarizing plates 10P, 10S, 20P, and 20S, the decrease of the amount of received light caused by the light selection can be restricted only to the decrease of the amount of received light in the initial light transmission.

In the embodiments described above, the region where the two kinds of light are outputted in the phototransmitter 1 or the optical filters (the polarizing plates 20P and 20S or the color filters 20R and 20B) that receive the two kinds of light are vertically arrayed. For example, in detecting a plate-like object that is vertically moved while a plate surface is set in the perpendicular direction, the region where the two kinds of light are outputted or the optical filters are horizontally arrayed.

What is claimed is:

1. A photoelectric sensor comprising:
a phototransmitter configured to output light toward a detection target region of an object comprising a thin substrate;
an optical receiver configured to receive the light outputted from the phototransmitter;
a signal processing unit configured to output a signal indicating that the thin substrate is detected in response to a decrease of an amount of light received by the optical receiver; and
two first optical filters that are provided between the phototransmitter and the optical receiver to transmit only pieces of light having specific characteristics,
wherein, in the phototransmitter, two kinds of light having different characteristics which do not interfere with each other are outputted from output regions in the light transmitting surface,
one of the two first optical filters has a characteristic of transmitting only one of the two kinds of light and the other of the first optical filters has a characteristic of transmitting only the other of the two kinds of light,
the two first optical filters are disposed opposite to output regions of the pieces of light different from the pieces of light of a selecting target while located across a detection target region,
two second optical filters having characteristics identical to those of the first optical filters are arrayed along the light transmitting surface so as to be opposite to the first optical filters having different characteristics, the second optical filters being located across the detection target region, and pieces of the light passing through the two second optical filters of the phototransmitter are outputted as the two kinds of light;
output directions of the two kinds of light are fixed such that whole surfaces of the first optical filters corresponding to the characteristics are irradiated with the two kinds of light from the phototransmitter when the first optical filters are disposed in a light transmitting surface while located away from each other by a predetermined distance or more,
each of the two kinds of light crosses diagonally the detection target region, an area where the two kinds of light crosses is configured to be a detection area where the thin substrate is detected;
wherein the detection region has a width which extends from the first optical filters to the second optical filters, and a height which extends generally perpendicular to the width; and wherein the thin substrate has a height which is less than the height of the detection region.

2. The photoelectric sensor according to claim 1, wherein an optical axis setting unit is provided in the phototransmitter, the optical axis setting unit changing an optical axis direction of the light from a light source to the output regions of the two kinds of light to a direction in which the first optical filters are disposed such that the light obliquely traverses the detection target region toward the positions in which the first optical filters are disposed.

3. The photoelectric sensor according to claim 1, wherein the two first optical filters are integrally provided in the optical receiver while arrayed in parallel in a light receiving surface of the optical receiver, and the optical receiver is disposed opposite to the phototransmitter along with the two first optical filters to receive the pieces of light passing through the first optical filters.

4. The photoelectric sensor according to claim 3, wherein the optical receiver is configured to individually collect the pieces of light passing through the two first optical filters and individually guide the pieces of collected light to light receiving elements.

5. The photoelectric sensor according to claim 1, wherein the phototransmitter and the optical receiver are provided in the same housing on an assumption that a return reflector plate is provided on an opposite side to the detection target region with respect to the two first optical filters, in the housing, a surface that is opposite to the detection target region acts as a light transmitting surface and a light receiving surface, and the optical receiver receives the light that is returned through the two first optical filters after being reflected by the return reflector plate in the two kinds of light that are outputted from the phototransmitter to pass through the optical filters.

6. The photoelectric sensor according to claim 1, wherein two kinds of light vibrated in specific directions and having different vibration directions are outputted from a light transmitting surface of the phototransmitter, and two polarizing plates are disposed as the two first optical filters opposite to the output regions of the pieces of light that are not the selection target while located across a detection target region, the two polarizing plates being directed to the selection of the vibration directions of the two kinds of light.

7. The photoelectric sensor according to claim 1, wherein two kinds of light having different wavelength ranges are outputted from a light transmitting surface of the phototransmitter, the two first optical filters are directed to the selection of the wavelength ranges corresponding to the two kinds of light, and the first optical filters are disposed opposite to the output regions of the pieces of light that are not the selection target while being located across a detection target region.

* * * * *